United States Patent
Carper et al.

[11] Patent Number: 5,964,268
[45] Date of Patent: *Oct. 12, 1999

[54] COUNTERBALANCING MECHANISM FOR AN OVERHEAD DOOR

[75] Inventors: Kenneth E. Carper, Madeira; Alan R. Leist, Cincinnati, both of Ohio

[73] Assignee: Clopay Building Products, Inc., Cincinnati, Ohio

[*] Notice: This patent is subject to a terminal disclaimer.

[21] Appl. No.: 08/846,891

[22] Filed: May 1, 1997

Related U.S. Application Data

[63] Continuation of application No. 08/435,586, May 5, 1995, Pat. No. 5,636,678, which is a continuation-in-part of application No. 08/262,135, Jun. 16, 1994, Pat. No. 5,632,063.

[51] Int. Cl.[6] .................................................. E05F 11/00
[52] U.S. Cl. ........................ 160/191; 160/201; 16/198; 16/DIG. 1; 16/DIG. 7
[58] Field of Search .................................. 160/191, 192, 160/318, 201, 23.1, 224, 178.1 R, 178.1 V, 176.1 V, 176.1 R, 900, 189; 49/200; 185/39, 44; 16/197, 198, DIG. 1, DIG. 7

[56] References Cited

U.S. PATENT DOCUMENTS

| | | |
|---|---|---|
| 1,183,254 | 5/1916 | Tony . |
| 1,992,006 | 2/1935 | Greegor . |
| 2,032,951 | 3/1936 | Pixley . |
| 2,083,467 | 6/1937 | Morris . |
| 2,097,242 | 10/1937 | Robinson . |
| 2,314,015 | 3/1943 | Parsons . |
| 2,630,597 | 3/1953 | Robinson . |
| 2,660,753 | 12/1953 | Moler . |
| 2,786,231 | 3/1957 | Robinson . |
| 2,932,057 | 4/1960 | Pemberton . |
| 3,047,905 | 8/1962 | Nobes . |
| 3,412,423 | 11/1968 | Binns . |
| 3,635,277 | 1/1972 | Bahnsen . |
| 3,921,761 | 11/1975 | Votroubek et al. . |

(List continued on next page.)

FOREIGN PATENT DOCUMENTS 250577  1/1964  Australia .

OTHER PUBLICATIONS

Brochure, "The Counterbalance Evolution!", Wayne®Dalton, Mt. Hope, Ohio 44660, ©1993, Wayne-Dalton Corp.

Primary Examiner—Blair M. Johnson
Attorney, Agent, or Firm—Wood, Herron & Evans, L.L.P.

[57] ABSTRACT

An overhead door apparatus utilizing a torsion spring counterbalancing mechanism. The counterbalancing mechanism includes a worm drive ring-shaped gear winding mechanism for setting the appropriate torque or number of winds in the spring. A counting mechanism is provided to indicate to the installer the number of winds being given to the spring. Means are also provided for accommodating spring growth and contraction during winding and unwinding using the winding mechanism and during normal raising and lowering of the door. A spring clip gear retainer is disclosed for preventing rotation or creep of the worm drive gear and spur gear during normal raising and lowering of the door. A second embodiment is disclosed allowing more universal interchangeability of components between the left and right sides of the door system, easy snap-in assembly, and including a telescoping spring cover. Each embodiment includes a spring winding counter.

11 Claims, 7 Drawing Sheets

U.S. PATENT DOCUMENTS

| | | |
|---|---|---|
| 4,057,219 | 11/1977 | Sobolewski . |
| 4,175,475 | 11/1979 | Eckhardt . |
| 4,191,237 | 3/1980 | Voege . |
| 4,316,493 | 2/1982 | Arena . |
| 4,522,245 | 6/1985 | Anderson . |
| 4,628,981 | 12/1986 | Ciriaci et al. . |
| 4,681,307 | 7/1987 | Leonard . |
| 4,731,905 | 3/1988 | Milano et al. . |
| 4,815,515 | 3/1989 | Lee . |
| 4,882,806 | 11/1989 | Davis . |
| 4,921,033 | 5/1990 | Finch et al. . |
| 4,930,182 | 6/1990 | Eichenberger . |
| 4,976,168 | 12/1990 | Lotznicker et al. . |
| 4,981,165 | 1/1991 | Miller et al. . |
| 5,036,899 | 8/1991 | Mullet . |
| 5,239,777 | 8/1993 | Husselton . |
| 5,275,223 | 1/1994 | Magro et al. . |
| 5,419,010 | 5/1995 | Mullet . |
| 5,632,063 | 5/1997 | Carper et al. . |
| 5,636,678 | 6/1997 | Carper et al. . |

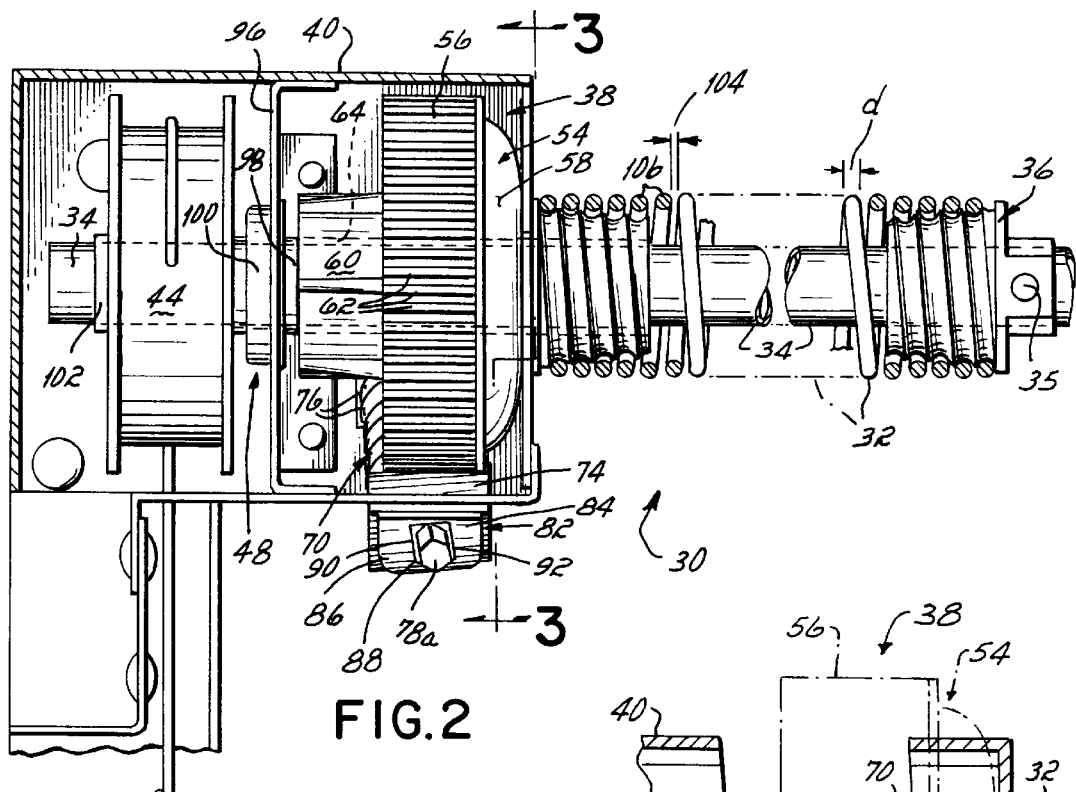
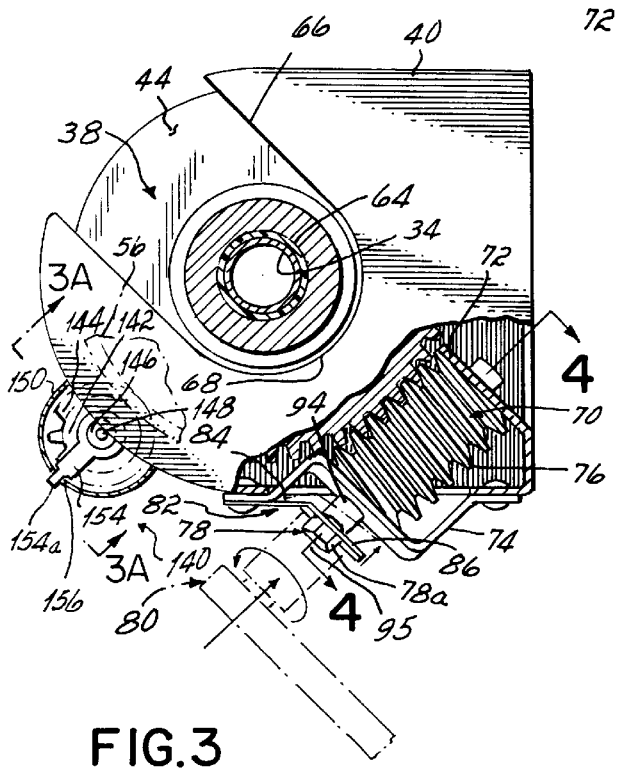
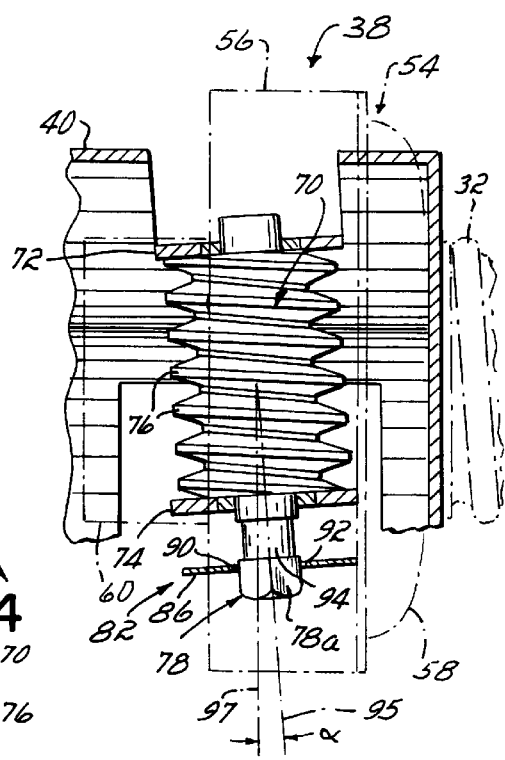
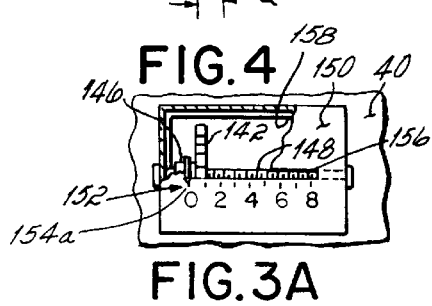
FIG.2
FIG.3
FIG.4
FIG.3A

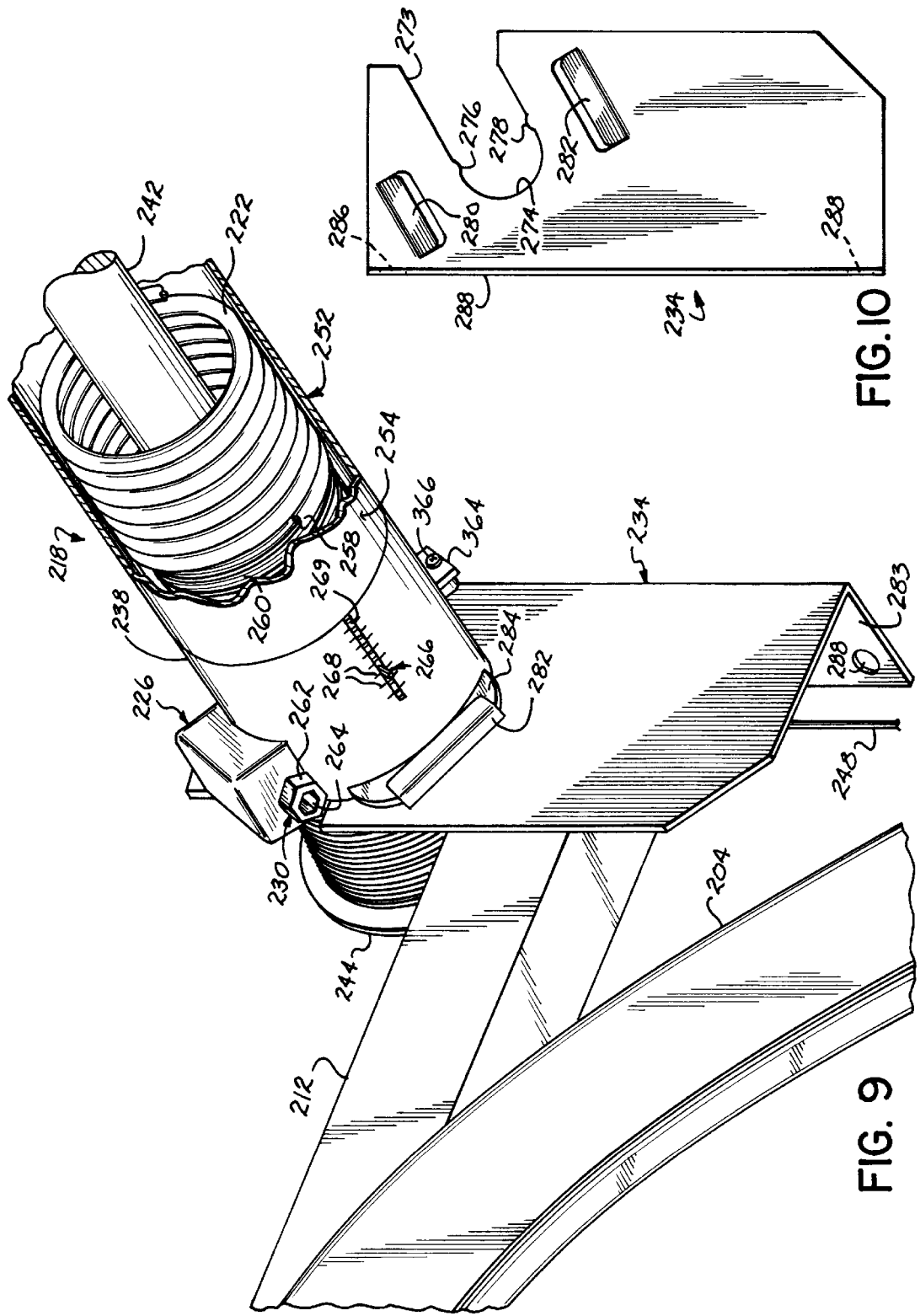

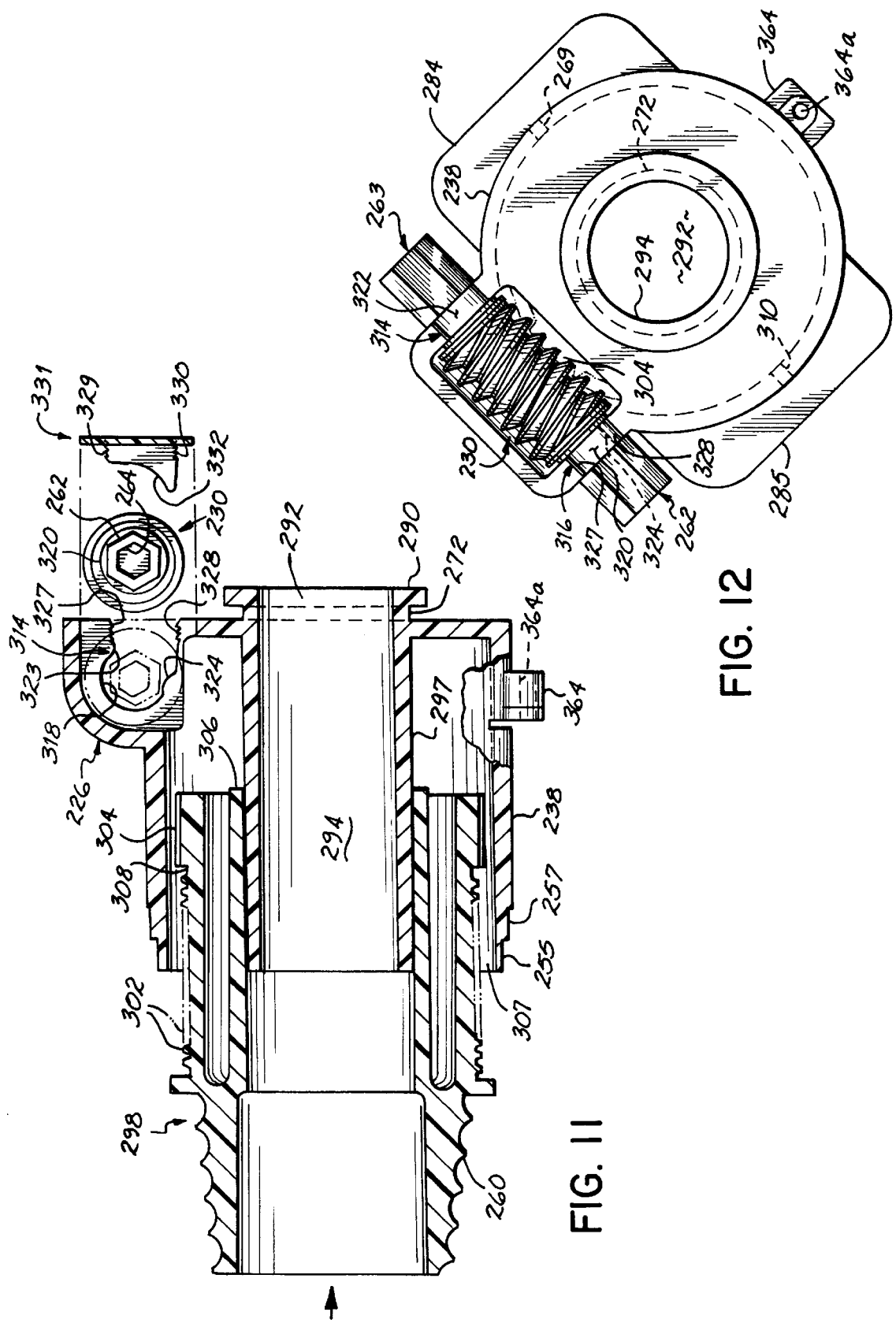

COUNTERBALANCING MECHANISM FOR AN OVERHEAD DOOR

This is a continuation, of application Ser No. 08/435,586, filed May 5, 1995 U.S. Pat. No. 5,636,678, which in turn was a continuation-in-part of application Ser. No. 08/262,135 filed Jun. 16, 1994, U.S. Pat. No. 5,632,063 each of which are hereby expressly incorporated by reference herein.

BACKGROUND OF THE INVENTION

The present invention generally relates to overhead doors of the type utilizing one or more counterbalancing torsion springs and, more particularly, relates to the torsion spring counterbalancing mechanism generally associated with such overhead doors as well as a winding mechanism for setting the counterbalancing force of the spring.

Overhead doors generally require a counterbalancing force which enables the door to be more easily moved between opened and closed positions either manually or by way of a powered opening device. Often, overhead door systems rely on one or more torsion springs for providing this counterbalancing force. These torsion springs must be wound during the installation of the garage door assembly such that they are provided with the necessary preset torque. Many systems require the installer to wind the spring manually by using a rod to rotate the free end of the spring with respect to a fixed end thereof and, after an appropriate number of turns, rigidly securing the free end of the spring to the torsion shaft of the overhead door assembly. This type of system is not only difficult to install but is also quite dangerous to install and remove due to the possibility of the installer inadvertently releasing the bar and being injured as a result. Thus, installers must be quite experienced to avoid the dangers involved with these prior systems.

Overhead door assemblies have been proposed in the past which have addressed problems involving manual winding of torsion springs. For example, certain gear systems have been disclosed for winding the torsion spring. Such worm gear arrangements are shown in U.S. Pat. Nos. 3,921,761; 4,882,806 and 4,981,165. In each of these systems, a ring-shaped worm gear is operatively coupled to the free end of the torsion spring and is rotated by way of a mating worm drive gear or pinion which may be driven either manually or with a power tool by the installer. Thus, rotation of the ring-shaped worm gear also rotates or winds the torsion spring to set the appropriate amount of torque in the spring.

These gear systems, however, each have disadvantages which make them impractical to use in all but the most elaborate and expensive overhead door assemblies. For example, these prior gear systems require a number of precision machined parts and further require very precise, and costly, assembly procedures. For example, the worm drive gear in each is designed to rotate about an axis perpendicular to the axis of the ring-shaped mating gear. Thus, the gear teeth on each gear must be precisely machined and matched to establish this perpendicular relationship. Additionally, the gear systems shown in U.S. Pat. Nos. 3,921,761 and 4,882,806 are designed such that the worm drive gear is oriented horizontally along an axis perpendicular to the overhead door. This makes it difficult for the installer to easily and safely apply a tool to the worm drive gear during the winding process. The worm drive gear disclosed in U.S. Pat. No. 4,981,165 is also shown in a horizontal orientation but also actually rotates with the torsion shaft and therefore this system includes the further undesirable possibility of leaving the worm drive gear in an even more inaccessible orientation. Also, each of the worm gear systems described in the above patents leaves open the possibility of undesirable rotation of the worm drive gear and ring-shaped gear and a resulting unwinding action of the torsion spring after the system has been wound. This may occur, for example, the vibration caused during everyday operation of the overhead door. Finally, none of these prior systems provide an easy manner of identifying the number of turns that have been made in the torsion spring. Further disadvantages of these systems will become more apparent upon review of the advantageous features of the present invention.

Overhead door assemblies prior to the present invention have also utilized torsion springs in which adjacent coils thereof abut one another when the spring is in a normal, unwound resting state. In other words, these springs have been manufactured in the past such that there is no gap left between adjacent coils. Therefore, during the initial winding process and during operation of the overhead door, frictional force arising as the result of rubbing action between adjacent coils of the shrinking spring must be overcome by the system. This places the system under additional stresses and strains which must be borne by the spring itself as well as the user or the powered door opener, each of which is undesirable. The additional stress and abrasion that the abutting coils cause on the spring may lead to a shorter effective spring life and/or premature failure of the spring.

Many prior systems not only use springs having abutting coils but further fail to adequately provide for the growth and contraction of the torsion spring during the operations of initially winding the spring and of spring unwinding and winding during raising and lowering of the door. Other systems that do provide some means for accommodating spring growth and contraction tend to be suitable for one operation but not the other or tend to be complicated systems which are impractical in many applications, such as residential applications, and which create new problems associated with their complicated design and installation procedures.

Still further disadvantages of existing systems involve the high costs of manufacturing and stocking parts respectively dedicated only to the left or right hand side of the overhead door system as well as the complexity of installing systems such as those disclosed in the patents mentioned above. Overall, past systems have generally either been rather simple but difficult and dangerous to install or perhaps easier to install but rather complex and expensive.

A need in the art therefore exists for improvements which, for example, allow easier installation of overhead door systems as well as improved operation thereof while maintaining low overall costs and a long useful life.

SUMMARY OF THE INVENTION

To address various problems apparent in the art, the present invention provides overhead door apparatus including a counterbalancing mechanism constructed in accordance with various embodiments as further described below. In a first embodiment of this invention a manner of accommodating spring growth and contraction in accordance with the present invention is through the provision of a torsion spring with a preset gap between adjacent coils of the spring when it is in its unwound, resting state. This gap is calculated to substantially accommodate the added number of coils which result from the initial winding process during installation. The advantage of this method of accommodating spring growth resides in its relatively low cost when compared to other methods.

Two alternatives to the above method of accommodating spring growth are also provided. In each alternative the counterbalancing apparatus includes a torsion shaft mounted for rotation between first and second stationary supports and a torsion spring having a first end operatively fixed to the torsion shaft such that the first end rotates with the torsion shaft and moves axially along the torsion shaft during raising and lowering of the overhead door. The axially moving end of the spring accommodates spring growth and contraction during any and all winding and unwinding operations of the spring. The torsion spring has a second end operatively connected to a winding mechanism mounted to the first support and functioning to wind the second end thereof with respect to the first end while the door is held stationary in the down or closed position.

A first alternative involves the use of a sliding spring fitting or cone which includes a key slidably received by a keyway in the torsion shaft. Preferably, the keyway comprises a pair of deformed, elongate depressions in the torsion shaft and the key comprises a complementary pair of protuberances within the sliding cone. The second alternative adds roller elements to the fitting or cone which are designed to reduce the friction and any possible binding between the fitting or cone and the torsion shaft. Each of these alternatives allow the transfer of torque to occur between the spring and the torsion shaft while accommodating the growth and shrinkage of the spring in an axial direction.

In accordance with another aspect of the invention, a winding mechanism is incorporated into the stationary support structure at the second end of the spring. Two embodiments of the winding mechanism are disclosed herein, however, each embodiment allows the second end of the spring to be easily rotated or wound with respect to the non-rotating first end thereof. Specifically, each embodiment of the winding mechanism generally includes a ring-shaped gear rotatably supported by the first stationary support and operatively affixed to the second end of the torsion spring such that rotation of the ring-shaped gear rotates the second end of said spring with respect to the first end of said spring. A worm drive gear is also rotatably supported by the first support and includes outer threads or teeth that mesh with the teeth of the ring-shaped gear. The worm is mounted in a "user friendly" orientation extending at an angle generally between an approximately vertical orientation and approximately a 45° orientation with respect to the plane of the door for providing easy access by an installer standing on the ground below the winding mechanism.

Each embodiment of the spring winding mechanism utilizes a ring gear formed integrally with a spring cone or fitting on which the second end of the spring is threaded. The ring gear and spring cone structure of each embodiment is referred to herein as a "gear cone". In the first embodiment, the ring gear is a spur gear which provides an extremely cost effective and universal component in the sense that it is neither right or left-hand dedicated, it also allows for significantly more "play" or "forgiveness" during installation than would conventional worm gear systems in which components thereof are designed to be in nearly perfect alignment with each other.

The first embodiment of the winding mechanism further includes a gear retainer which engages the winding mechanism to restrain the spur gear and worm drive gear from rotating during normal operation of the door. However, the gear retainer is disengageable from the gear system to allow operation of the gear system during winding and unwinding of the torsion spring, respectively, during installation and removal thereof. The gear retainer automatically engages and disengages the worm drive gear upon removal and application of an appropriate tool used to rotate the worm drive gear. During normal operation of the door, the gear retainer prevents so-called "creep" or undesirable rotation of the worm drive gear, spur gear and any resulting unwinding of the torsion spring from its pre-torqued, wound state.

In a further aspect of the first embodiment of the winding mechanism, the various components associated therewith are constructed and fixed in place such that the longitudinally directed thrust load of the torsion spring is not directed onto the sheet metal construction of the stationary support or mounting structure. Rather, this thrust load is borne by the torsion shaft which is placed under tension by the load and is much more able to bear the load than is the sheet metal support structure.

The present invention also contemplates a second embodiment which provides for a more "universal" construction of various components associated with the winding mechanism. That is, the gear housing and gears of the mechanism, as well as the mounting bracket for the housing may be mounted on the right or left side of the door while disposing the worm at a predetermined easily accessible orientation. Also, a bearing unit is provided having the same connecting elements as the gear housing such that full interchangeability of the winding mechanism with a bearing unit is provided when only one counterbalancing mechanism is necessary. In the situation in which a relatively heavy overhead door requires two counterbalancing mechanisms, the same winding mechanism components are used on each side of the overhead door. Lower manufacturing costs and other associated costs result as differently designed left and right handed components do not have to be separately manufactured and stocked.

The gear housing and the bearing units of the "universal" second embodiment are each able to be interchangeably mounted to the same mounting bracket. The worm of the gear housing is disposed at an accessible orientation and preferably at an acute angle with respect to the plane of the door opening or the same "user friendly" orientation as in the first embodiment. The housing also acts as a bearing unit. Thus, when only one counterbalancing mechanism is necessary, a winding mechanism is fixed to a mounting bracket on one side of the torsion shaft and the other end of the torsion shaft is supported for rotation in a bearing unit fixed to a second mounting bracket. As the same mounting or connecting elements are used on both the housing and the bearing unit and the respective mounting brackets, when a bearing unit must be substituted with a housing, or vice versa, it is simply a matter of substituting one component for the other and attaching it in the same manner. In addition, the mounting or installation operations of the housing, the worm within the housing, and the bearing unit all involve only snapping the respective components into place without separate fasteners. These features, added to the ability to use the same components on each end of the torsion shaft, creates a very versatile system with relatively low overall costs.

As a further feature of the second embodiment, the worm further includes tool engageable drive portions on respective ends such that a worm drive portion is exposed away from the inside of the door in a "user friendly" orientation no matter what side of the door the gear housing is mounted on. In the second embodiment, this orientation may be defined as one in which the worm extends at an acute angle with respect to the plane of the overhead door opening. Specifically, this orientation may be approximately 30° relative to the door opening. This same orientation is obtained whether the winding mechanism is mounted on the left or right hand side of the door.

Also, the dual drive worm may be snapped into place in either of two possible ways while ensuring that a drive portion is exposed in the desirable "user friendly" orientation. When snapped in place, a first drive portion is therefore exposed in the "user friendly" orientation, however, the second drive portion is also exposed outside of the housing such that it may be engaged by a tool. This feature provides a back up driving location if the first drive portion is damaged or if it is simply more convenient in a particular application to drive the worm with the second drive portion. Engagement of the worm with the helical ring gear portion of the gear cone also assists in trapping the worm firmly into place within the gear housing.

Finally, a winding counting device is provided in each embodiment to indicate the number of turns made in the torsion spring during the installation procedure. This is especially desirable when a direct view of the torsion spring is prevented by a cover provided for aesthetic purposes. In the first embodiment, the counting device comprises a toothed wheel which engages the ring gear and traverses along a scale indicating the number of spring windings. In the second embodiment, the counting device comprises a clip which attaches to a threaded portion of the gear cone located between the cone portion and the gear portion thereof. The clip has a pointer extending outwardly through a slot in the housing and indicating the number of windings on a scale provided on the housing.

These and other advantages of the present invention will become more readily apparent upon review of the following detailed description of the preferred embodiments thereof taken in conjunction with the accompanying drawings.

BRIEF DESCRIPTION OF THE DRAWINGS

FIG. 2 is a cross sectional view of the counterbalancing mechanism taken along line 2—2 of FIG. 1 but shown with the torsion spring thereof in the unwound state thereof corresponding to a raised, opened door;

FIG. 3 is a partially fragmented view of the torsion spring winding mechanism of the first embodiment taken generally along line 3—3 of FIG. 2;

FIG. 3A is a cross-sectional view of the torsion spring winding mechanism taken along line 3A—3A of FIG. 3 to show details of the device for counting the number of spring windings;

FIG. 4 is a cross sectional view of the torsion spring winding mechanism taken generally along line 4—4 of FIG. 3;

FIG. 9 is a fragmented perspective view of the winding mechanism on the left hand side of overhead door assembly as shown in FIG. 8;

FIG. 10 is a front elevational view of the mounting bracket used for the winding and counterbalancing mechanisms of FIG. 9;

FIG. 11 is a partially fragmented and exploded view of the spring winding mechanism with the housing and gear cone in cross section to illustrate the mounting and engagement of the gear cone therein;

FIG. 12 is an end view of the spring winding mechanism shown in FIG. 11 but with the housing and gear assembly fully assembled within the housing and the housing rotated 60° to show a preferred orientation of the worm in use;

DETAILED DESCRIPTION OF THE PREFERRED EMBODIMENTS

Figure 1:
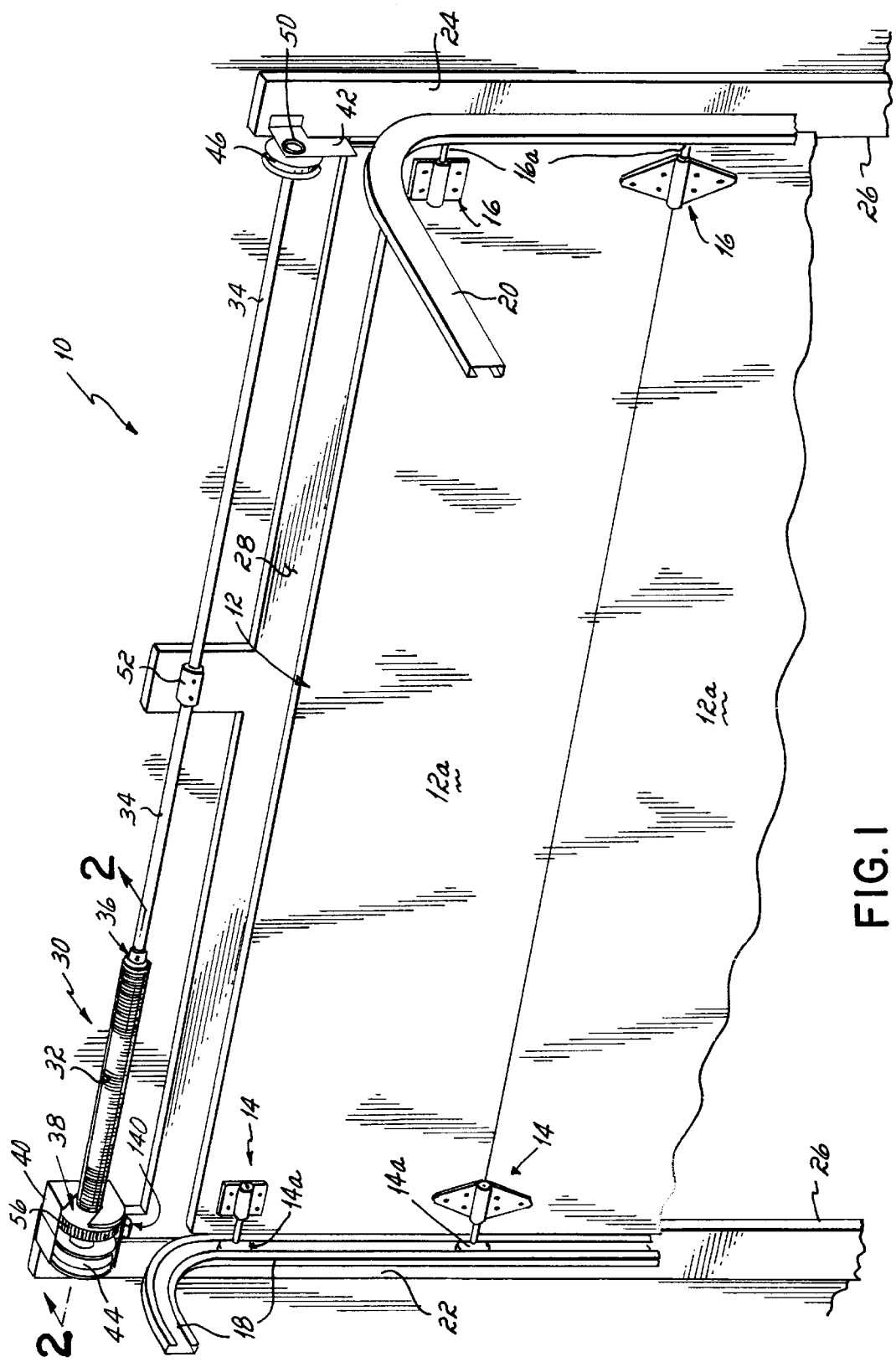
FIG. 1 is a diagrammatic perspective of an overhead door assembly with the door in a lowered, closed position and incorporating a first preferred embodiment of the counterbalancing mechanism of the present invention.

Referring first to FIG. 1, a first embodiment of the present invention generally comprises an overhead door system 10, such as a residential garage door or a commercial overhead door system, including a door 12 which may be conventionally made up of a plurality of horizontal, hinged panels 12a. Panels 12a each have roller assemblies 14, 16 affixed at opposite ends thereof, at least some of which are associated with the door panel hinges, for example, and which include rollers 14a, 16a riding in a pair of curved tracks 18, 20 as is conventional in the art. Tracks 18, 20 are rigidly affixed to side frame members 22, 24 which, in part, define a door opening 26. As is conventional, tracks 18, 20 may also be supported from structure (not shown) disposed above frame members 22, 24. Door opening 26 is further defined by upper frame structure 28.

As further shown in FIG. 1, door 12 may be raised and lowered to respectively expose and close door opening 26 and, to assist in such raising and lowering operations, a counterbalancing mechanism 30 is used and constructed in accordance with the present invention. Counterbalancing mechanism 30 generally includes a torsion spring 32 which has a first end operatively connected to a torsion shaft 34 by being threaded onto an inner spring fitting or cone 36 in a conventional manner. Cone 36 is rigidly affixed to torsion shaft 34 by a plurality of set screws 35, one of which is shown in FIG. 2. Torsion spring is operatively connected to a winding mechanism 38 at a second end thereof. The winding mechanism 38 is supported by a first fixed support 40 which comprises a housing constructed of sheet metal and rigidly fastened, as with bolts (not shown), to the frame structure 22 adjacent to door opening 26. A second fixed support 42 is located at the opposite end of torsion shaft 34 and is likewise constructed of sheet metal and rigidly fastened to the frame structure 24 adjacent to door opening 26. Torsion shaft 34 is supported for rotation between fixed supports 40, 42 and further includes drums 44, 46 rigidly affixed, as with set screws (not shown), to torsion shaft 34 for rotation therewith in a conventional manner. Cables extend from drums 44, 46 and are connected to the bottom of the overhead door 12 in a conventional manner. Torsion shaft 34 is connected to fixed support 40 by way of a roller bearing 48 (FIG. 2), as further discussed below, and to fixed support 42 by way of a second roller bearing 50. Bearings 48, 50 allow rotation of torsion shaft 34 during operation, i.e., raising and lowering, of door 12. Torsion shaft 34 has a two-piece construction with the pieces being connected to each other at a central location by a coupling 52.

Referring now to FIGS. 2–4, winding mechanism 38 includes a gear cone 54 which incorporates a ring-shaped gear 56 thereon as well a cone portion 58 and a hub portion 60. Gear 56, cone portion 58 and hub portion 60 are integrally formed with one another, preferably by being die cast as a single unit from aluminum. Ring shaped gear 56 is preferably a spur gear, that is, gear 56 includes straight, peripheral teeth 62 which are both parallel to one another and parallel to the axis of rotation of gear 56. This aspect of the invention is the feature that allows the entire gear cone 54, including gear 56 incorporated therein, to be die cast in a single molding operation. The use of a spur gear 56 also causes the gear cone 54 to be "universal" in the sense that it may be used on either end of torsion shaft 34.

As best shown in FIG. 3, gear cone 54 is mounted for rotation within housing 40 and about torsion shaft 34. In this regard, a cylindrical Nylon bushing 64 is press fit within gear cone 54. Torsion shaft 34 rotates with respect to gear cone 54 and its inner bushing 64. Specifically, and as further discussed below, gear cone 54 and bushing 64 rotate about torsion shaft 34 during the initial winding of torsion spring 32 and torsion shaft 34 rotates within gear cone 56 and bushing 64 during raising and lowering operations of door 12. As further shown in FIG. 3, gear cone 56 is received by a slot 66 in housing 40 but remains spaced from an inner end 68 of slot 66 such that housing 40 does not prevent free rotation thereof during a winding operation.

Winding mechanism 38 further includes a worm drive gear 70 mounted for rotation within housing 40 between brackets 72, 74. Worm drive gear 70 includes outer, helical teeth or threads 76 which mesh with teeth 62 of spur gear 56. Rotation of worm drive gear 70 in one of the two possible directions will therefor rotate gear cone 54 in a corresponding direction to either wind or unwind torsion spring 32. To facilitate rotation of worm drive gear 70, a driving head 78, engageable by a suitable tool, is provided on an exposed end thereof. In the preferred embodiment, driving head 78 includes a hex portion 78a which may be engaged by a socket tool 80 (FIG. 3) and rotated either manually or in a power assisted manner such as by being pneumatically driven.

In accordance with another aspect of this invention, a gear retainer 82 is provided for preventing rotation of worm drive gear 70 and gear cone 54 when hex portion 78a is not engaged by tool 80 but for allowing rotation thereof when hex portion 78a is engaged by tool 80. Specifically, gear retainer 82 comprises a resilient spring clip 84 which is rigidly secured to housing 40 and includes an angled portion 86 which normally engages the hex portion 78a of head 78 in the clip's unbiased state, shown in solid in FIG. 3. As best illustrated in FIGS. 2 and 4, portion 86 of clip 84 includes an aperture 88 through which hex portion 78a of head 78 extends. Aperture 88 has at least two straight edges 90, 92 that engage hex portion 78a of head 78 to normally prevent or restrain any rotation of worm drive gear 70 and therefore of gear cone 54 during normal operation of door 12. During winding and unwinding of the spring with the door maintained stationary, however, tool 80 is pushed onto hex portion 78a of head 78 and this pushes portion 86 of clip 84 to the position shown in phantom in FIG. 3 such that aperture 88 and, more specifically, edges 90, 92 are in alignment with a stepped down or recessed portion 94 of head 78. When aperture 88 is aligned about stepped down or recessed portion 94, hex portion 78a of head 78 is free to rotate and worm drive gear 70 may therefore also be rotated to either wind or unwind spring 32.

As illustrated in FIG. 3, worm drive gear 70 extends along an axis 95 which is ideally fixed at approximately 45° to horizontal and extends into the plane of door opening 26 (FIG. 1) with the drive head 78 directed downwardly and inwardly into the interior of, for example, the garage. More generally, for easy access by an installer standing on the ground below winding mechanism 38, worm drive gear 70 is preferably oriented between an approximately vertical orientation and approximately the 45° position shown in FIG. 3. As further shown in FIG. 4, the axis 95 of worm drive gear 70 is also oriented at a slight angle α with respect to a plane 97 which is perpendicular to door opening 26 and to the axis of rotation of spur gear 56. Angle a substantially corresponds to the lead angle of the teeth or threads 76 of worm drive gear 70 and may, for example, be approximately 4°. Angle α results from the angled teeth or threads 76 meshing with the straight, parallel teeth 62 of spur gear 56 which extend parallel to the axis of rotation of spur gear 56. This aspect of the invention allows even easier access to the head 78 of worm drive gear 70 by the installer since the head 78 of worm drive gear 70 is not only angled downwardly toward the installer, but also inwardly toward the center of door opening 26.

Referring again to FIG. 2, housing 40 further includes a bearing plate 96 into which bearing 48 is press fit. Inner race 98 of bearing 48 receives and rotates with torsion shaft 34 and with respect to outer race 100 which remains stationary. Inner race bears against bushing 64 (FIG. 3) on one side and against hub 102 of drum 44 on the other side. Therefore, as drum 44 and its hub 102 are rigidly affixed to torsion shaft 34 at one end of counter balancing mechanism 30 and inner spring fitting or cone 36 is affixed to torsion shaft 34 at the opposite end, there is no thrust load or, in other words, there is virtually no longitudinally directed force on the sheet metal housing 40 and bearing plate 96. In this regard, torsion shaft 34 bears virtually all of this thrust load since, by design, it is placed under tension between the two rigid, e.g., set screw, connections respectively made between torsion shaft 34 and drum 44 at one end and between torsion shaft 34 and fitting 36 at the other end. For this reason, the longitudinally directed stresses are experienced by torsion shaft 34 rather than by housing 40 and bearing plate 96 which are made of sheet metal much less able to handle such stress over time than the tubular torsion shaft 34. Also, due to this design bearing 48 does not need to be a relatively expensive thrust bearing but need only be a simpler, less expensive roller bearing.

In another aspect of the first embodiment of this invention, torsion spring 32 is formed with a specifically determined gap 104 formed between adjacent coils 106 when the spring 32 is in a resting or unwound state. Gaps 104 allow additional coils 106 to be added to the spring during the initial winding process and during the winding that occurs while lowering door 12. Since adjacent coils 106 do not touch as spring 32 is wound and as additional coils are added, there is no need to overcome the additional frictional forces encountered with conventional springs having abutting coils. It has been found that the specific gap must be formed precisely in order to retain the necessary rigidity and performance of the spring across many varied applications. In accordance with the present invention, the size of each gap 104 between adjacent coils 106 is generally determined by the following formula:

$$Gap = \frac{(d) \times (\Delta N) \times (f_0)}{N}$$

where:
 d=diameter of coil spring wire
 ΔN=number of coils added during winding
 $f_o$=overtravel factor
 N=total number of coils of unwound spring For a residential application, a typical spring wire diameter (d) may be ¼" and a typical number of coils added during winding (ΔN) may be approximately 10 while a typical total number of coils (N) may be about 100. Ideally, gaps 104, each being the same width, would be calculated such that at the end of an initial winding operation to set the required torque in the spring 32, adjacent coils 106 would just abut one another. However, an overtravel factor $f_o$ has been included in the above formula to allow for some overwinding of the spring during installation of the counterbalancing mechanism 30. The overtravel factor will be approximately in the range of 1.1–2.0 and is preferably about 1.25. This factor results in a gap that is somewhat greater than ideal but that is desirable to allow for an installer to "over-wind" the spring to some extent without causing adjacent coils 106 to rub against one another as a result of such over-winding. Therefore, as one example, a residential torsion spring might have gaps 104 between adjacent coils 106 calculated as follows:

$$Gap = \frac{(.25) \times (10) \times (1.25)}{100} = 0.03125'' = 1/32''$$

These gaps will vary from application to application, however, using the above formula of the present invention, an appropriate gap 104 may be calculated for each application such that the coils added during winding are accommodated while maintaining the structural integrity and performance of the spring. For many applications, especially residential applications, the gaps will be between about 1/64" and 1/32".

Figure 5:
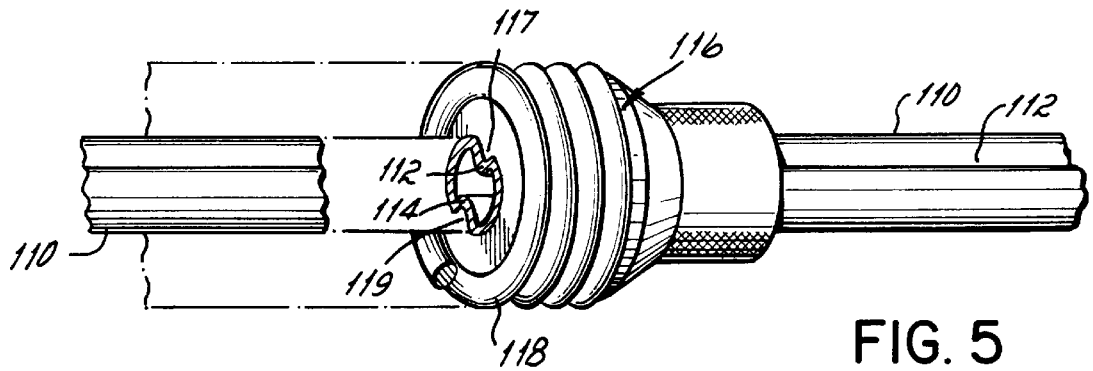
FIG. 5 is a perspective view of an alternative embodiment of the spring end fitting and torsion shaft of the counterbalancing mechanism.

Another manner of accommodating spring growth and contraction according to the present invention is illustrated in FIG. 5. This figure only shows the spring end fitting or cone of the counterbalancing mechanism as well as a portion of the torsion shaft thereof. The remaining portions of the counterbalancing mechanism are preferably identical to those of counterbalancing mechanism 30 shown in FIGS. 1–4. According to this embodiment of the invention, the torsion shaft 110 is shaped with two, diametrically opposite elongate depressions 112, 114 which extend along the length of the tubular shaft 110. Torsion shaft 110 receives a spring end fitting or cone 116 in a manner which allows end fitting or cone 116 to move axially or slide along torsion shaft 110 but not to rotate about torsion shaft 110. Specifically, end fitting or cone 116 includes two oppositely directed protuberances 117, 119 which complement the depressions 112, 114 and mate therewith in a manner similar to key and keyway connections.

An outer end of spring 118 is fixed to a stationary support, such as to the winding mechanism 38 and housing 40 as shown in FIGS. 1–3 while the inner end of spring 118 is threaded onto cone 116 in a conventional manner. Cone 116 is free to slide along torsion shaft 110 to accommodate growth and contraction of spring 118 during initial winding thereof as well as during raising and lowering of the overhead door. Significantly, end fitting or cone 116 is not fixed to shaft 110 with a set screw as is conventional but does rotate therewith because of the unique key/keyway type connection. A conventional spring having abutting coils in its unwound state may be utilized in this embodiment as the use of a sliding end cone accommodates the coils added during winding processes.

Figure 6:
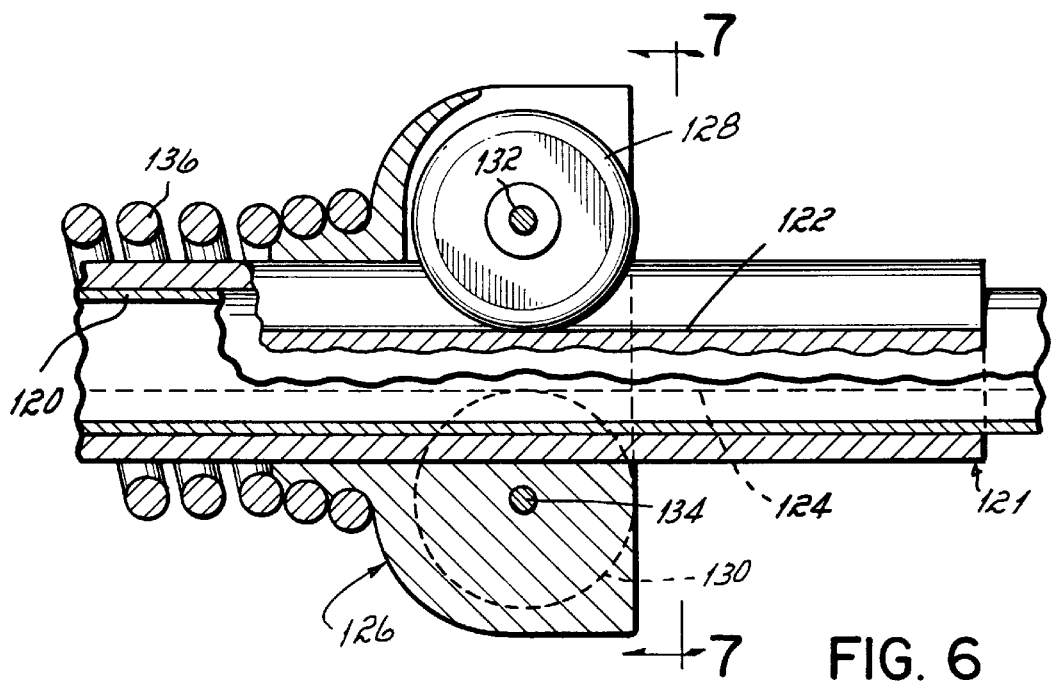
FIG. 6 is a cross sectional view in side elevation of a third alternative of the spring end fitting and torsion shaft of the counterbalancing mechanism.
Figure 7:
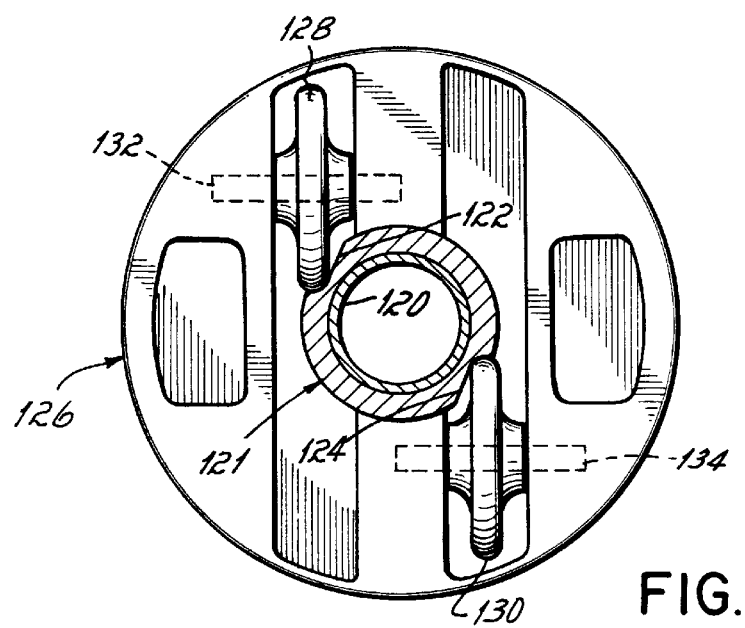
FIG. 7 is a cross sectional view taken along line 7—7 of FIG. 6.

FIGS. 6 and 7 illustrate a still further embodiment of an axially movable inner fitting or end cone which is identical in purpose and design to the fitting or cone 116 shown in FIG. 5 except that means are provided for reducing sliding friction between the end cone and the torsion shaft. More particularly, a torsion shaft 120 mounts a sleeve having two, oppositely facing elongate recesses or grooves 122, 124 which extend an appropriate length along shaft 120 to accommodate growth and contraction of spring 136. The sleeve 121 of torsion shaft 120 receives a spring end fitting or roller cone 126 in a manner which allows end fitting or roller cone 126 to roll axially along torsion shaft 120 but not to rotate about torsion shaft 120. Specifically, end fitting or roller cone 126 includes friction reducing rolling elements preferably taking the form of two rollers 128, 130 which register within and roll along the respective recesses 122, 124. Rollers 128, 130 are fixed within roller cone 126 by respective pins 132,134 about which rollers 128, 130 rotate.

An outer end of spring 136 is fixed to a stationary support, such as to the winding mechanism 38 and housing 40 as shown in FIGS. 1–3 while the inner end of spring 136 is threaded onto cone 126 in a conventional manner. Cone 126 rolls along the sleeve 121 of torsion shaft 120 to accommodate growth and contraction of spring 136 during initial winding thereof as well as during raising and lowering of the overhead door.

As mentioned above, the embodiment of FIGS. 6 and 7 is aimed at reducing the friction between the end cone and torsion shaft. Such undesirable friction might be present in the sliding cone 116 and torsion shaft 110 constructed in accordance with FIG. 5. It is also contemplated, however, that an anti-friction surface or coating may be used in the embodiment of FIG. 5 between the two relatively sliding components. This might comprise a coating of lubricated plastic or other anti-friction material on the outside surface of torsion shaft 110 or an insert of lubricated plastic or other anti-friction material within cone 116.

Returning now to FIG. 3 taken along with FIG. 3A, a counting mechanism 140 is provided with winding mechanism 38 in order to allow an installer to readily identify the number of turns being given to torsion spring 32 by way of tool 80 during installation of system 10. Counting mechanism 140 includes a counter gear 142 having a plurality of gear teeth 144 that extend through a window 158 in housing 40 and mesh with gear teeth 62 of gear 56. Counting gear 142 further includes a central, internally threaded hub 146 that receives an externally threaded, fixed rod 148. Threaded rod 148 is rigidly fixed at opposite ends thereof to a counting mechanism housing 150. Thus, as gear 56 is rotated by worm drive gear 70, counter gear 142 will rotate and, at the same time, translate along fixed threaded rod 148. Graduations 152 are provided on the outside of housing 150 to give a visual indication to the installer of the number of turns or winds. A pointer 154 is connected to the outside of hub 146 such that relative rotation is allowed between counting gear 142 and pointer 154 and gear 142. Pointer 154 has an end portion 154a that protrudes from a slot 156 in housing 150.

End portion 154a points to a particular graduation or number 152 on the outside of housing 150 to indicate the number of turns in spring 32. It will be appreciated that other indicators may be provided instead of pointer 154 and graduations 152. For example, a counter wheel having numbers for indicating the number of turns might be substituted into counting mechanism 140 by one of ordinary skill.

In the preferred embodiment, counting gear 142 will have nine teeth while gear 56 will have forty-five teeth thus creating a ratio of 5:1. Every five turns of counter gear 142, end portion 154a of pointer 154 will point to another graduation thus indicating another turn of gear 56 and spring 32. Typically, torsion springs such as spring 32 will require approximately seven to eight turns. It will be appreciated that other gear ratios may be chosen in conjunction with various thread pitches of rod 148. In all cases, the translation of counter gear 142 will never be greater than the width of gear 56.

Figure 8:
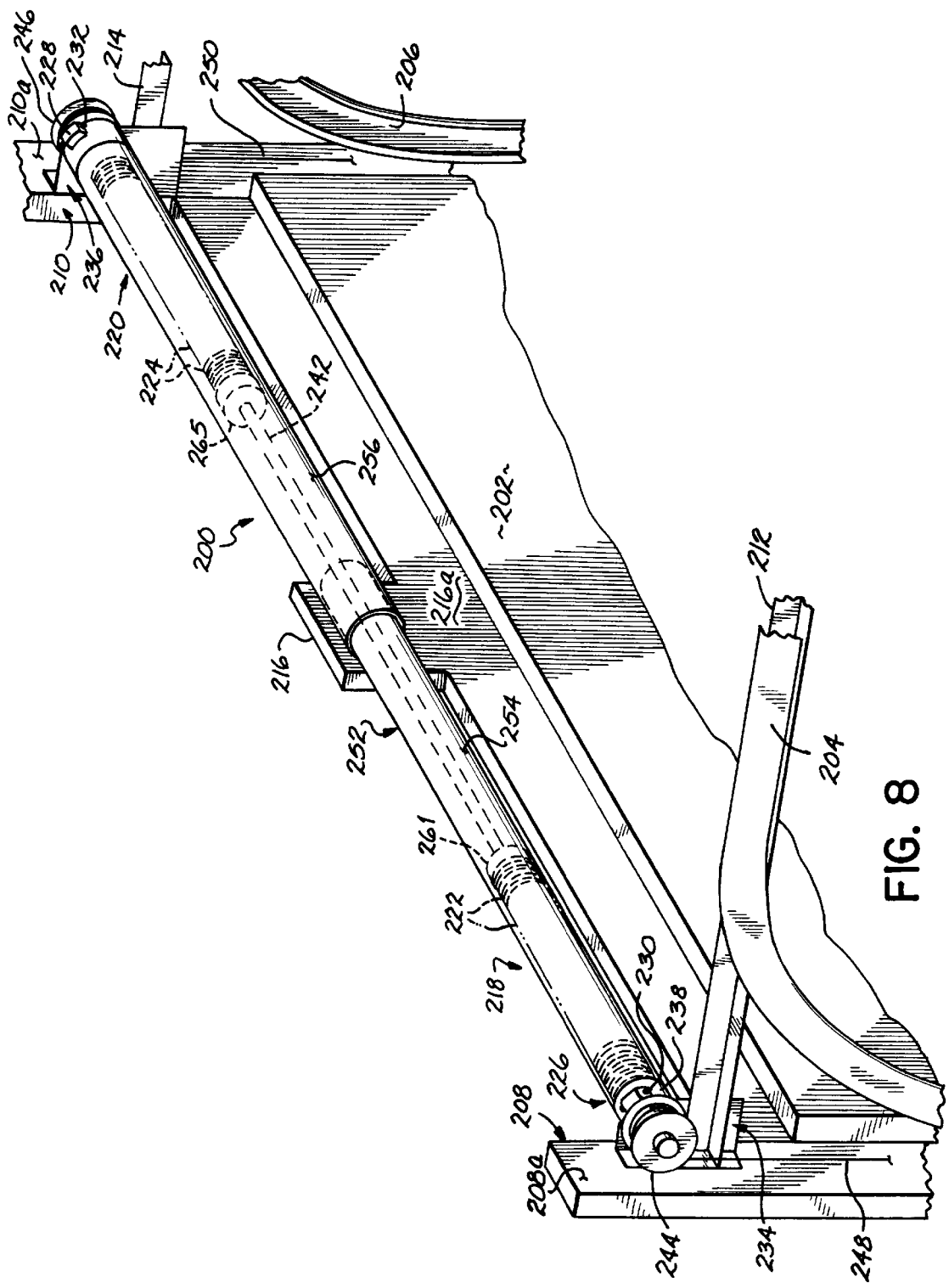
FIG. 8 is a diagrammatic perspective of an overhead door assembly with the door in a lowered, closed position and incorporating a second embodiment of the counterbalancing mechanism of the present invention.

Referring now to FIG. 8, a second embodiment of the present invention generally comprises an overhead door system 200 which may be identical to the first embodiment in that a conventional sectional door 202 is provided and supported for movement on tracks 204, 206 by rollers (not shown). Tracks 204, 206 are rigidly affixed to side frame members 208, 210 and by upper metal frames 212, 214. The door opening is defined by side frame members 208, 210 as well as upper frame structure 216. In accordance with this second embodiment, universal counterbalancing mechanisms 218, 220 are provided for assisting with the opening and closing operations of door 202. Two such counterbalancing mechanisms 218, 220 are shown in FIG. 8, however, only one of the mechanisms 218, 220 may be necessary depending on factors such as the spring force provided and the weight of door 202.

Still referring to FIG. 8, counterbalancing mechanisms 218, 220 are each generally constructed with components similar in function to the first embodiment. In this regard, the description of torsion springs 222, 224 given with respect to the first embodiment above may be referred to here as well and any of the alternatives for accommodating spring growth may be used in the second embodiment as well. The significant differences between the counterbalancing mechanism 30 of the first embodiment and counterbalancing mechanisms 218, 220 of the second embodiment concern the various components which comprise the universal winding mechanisms 226, 228. These mechanisms 226, 228 are referred to as being "universal" in the sense that the same components may be mounted on the left hand side of door 202, as is mechanism 226, or on the right hand side of door 202, as is mechanism 228. In each location, the respective worms 230, 232 are disposed in a "user friendly" orientation extending at an acute angle relative to the plane of the door opening between frames 208, 210, 216. For purposes of simplicity, the plane of the door opening may be considered as the same as a plane containing surfaces 208a, 210a, 216a of frames 208, 210, 216. As will be appreciated from the description below, the angular disposition of worm 230 is specifically shown to be 30° relative to the plane of the door opening.

Winding mechanisms 226, 228 are supported by respective fixed stationary supports or mounting brackets 234, 236 which mount gear housings 238, 240 constructed in accordance with this second embodiment. A torsion shaft 242 is supported for rotation between mounting plates 234, 236 and a pair of drums 244, 246 are rigidly affixed, as with set screws (not shown), to torsion shaft 242 for rotation therewith in a conventional manner. Cables 248, 250 extend from drums 244, 246 and are connected to the bottom of the overhead door 202 also in a conventional manner.

When two counterbalancing mechanisms 218, 220 and their associated gear housings 238, 240 are used as shown in FIG. 8, gear housings 238, 240 provide bearings for torsion shaft 242 in the manner discussed below. Preferably, housings 238, 240 are formed from injection molded Nylon having approximately 50% fiber glass/ceramic filler to provide. The specific preferred material is "Esbrid" No. NSG 240A which may be obtained from Thermofil, Inc., located in Brighton, Mich. All of the major components of winding mechanisms 226, 228 are preferably formed from this plastic material. Torsion shaft 242 and springs 222, 224 are completely enclosed by a cover 252 which is comprised of two telescoping sections 254, 256. Cover 252 provides protection in the event that spring 222 or 224 breaks, while the telescoping nature thereof allows one section 254 or 256 to be easily moved toward the other to expose spring 222 or 224 during installation, maintenance or inspection procedures. The outer end of each section 254, 256 is connected to winding mechanisms 226, 228 and specifically to the housings 238 of each. In this regard, referring briefly to FIG. 11, two stepped portions 255, 257 are provided on housing 238 such that housing 238 may frictionally receive either smaller diameter section 254 or larger diameter section 256 depending on which side of door 202 housing 238 is mounted.

FIG. 9 illustrates the left hand side counterbalancing mechanism 218 from which the identical components forming mechanism 220 will be fully understood. Inner end 258 of torsion spring 222 is threaded onto a cone portion 260 which is rotatable relative to torsion shaft 242 and will be discussed further below. Referring briefly to FIG. 8 inner ends of each spring 222, 224 also include respective fittings or "cones" 261, 265 for attaching springs 222, 224 to torsion shaft 242. These cones 261, 265 may be axially movable as in the first embodiment or spring 222 may be have gaps between adjacent coils as in the first embodiment to accommodate spring contraction and growth during winding.

Worm 230, which is used to effect winding of spring 222 in the same manner as described above with respect to the first embodiment, includes drive portions 262, 263 (FIG. 12) at each end each comprising an external hex drive and each further including an internal hex drive, although only one internal hex drive 264 is shown in the drawings. Thus, worm 230 may be engaged by different types of tools at both ends. One of the ends 262 will be exposed at a user friendly orientation at approximately a 30 degree angle measured up from the plane of the door opening, which plane may be defined as the plane of plate section 283 of bracket 234 for simplicity when viewing FIG. 9. More generally, this angle is at least an acute angle measured up from the plane of the door and preferably between vertical and approximately 45° with respect thereto. As will be described below, a pointer 266 indicates the number of spring windings on a scale 268 as pointer 266 projects through and traverses along a slot 269 contained in housing 238.

Turning now to FIG. 10–12, mounting bracket 234 and housing 238 are uniquely designed to allow housing 238 to be connected to mounting bracket 234 in an easy snap-in operation and without the use of additional fasteners. Specifically, as shown in FIG. 10, mounting bracket 234 is provided with a slot 270 which receives a cylindrical mounting portion 272 (FIG. 11) of housing 238 with a close sliding fit. Slot 270 includes an open end 273 and a closed curved end 274 having a radius of curvature equal to the radius of cylindrical mounting portion 272 (FIG. 11) of housing 238.

Two opposed projections or inward "bumps" 276, 278 are formed at each end of curve 274. Curve 274 forms slightly more than a semicircular curve between these two projections 276, 278 such that cylindrical mounting portion 272 (FIG. 11) is firmly held in place for rotation in closed end 274 by projections 276, 278 after cylindrical mounting portion has been "snapped" past projections 276, 278.

As shown best in FIG. 10, mounting bracket 234 further includes two flange mounts 280, 282 which receive oppositely extending flanges 284, 285 (FIG. 12) of housing 238 as housing 238 is slid into slot 270 and snapped in place between projections 276, 278. Mounting bracket 234 is generally "L"-shaped in cross section and includes one plate section having flange mounts 280, 282 and one perpendicular section 283 including mounting holes 286, 288 for mounting bracket 234 to surface 208a of frame member 208 (FIG. 8).

An overall understanding of the construction of winding mechanism will be best understood from FIGS. 11 and 12. A circular flange 290 is provided adjacent to cylindrical mounting portion 272 for holding housing 238 in the position shown in FIG. 9 with bracket 234 disposed between flanges 284, 285 and flange 290. Flanges 284, 285 extend away from housing 238 in directions parallel to the axis of worm 230 which is disposed therebetween. A central hole 292 is formed for closely receiving torsion shaft 242 (FIG. 9) for rotation therein. Specifically, a cylindrical inner bearing surface 294 is provided for torsion shaft 242 (FIG. 9) by a cylinder 296 molded into housing 238. As further shown in FIG. 11, an integral gear cone 298 is mounted for rotation within housing 238. Gear cone 298 is integrally formed with a cone portion 260, a threaded portion 302 and a helical gear portion 304. An inner cylinder 306 is molded into gear cone 298 and is received for rotation on cylinder 296 within housing 238 by simply sliding gear cone 298 completely into open end 307 of housing 238. For reasons discussed below, an annular retaining slot is provided between threaded portion 302 and helical gear portion 304 of gear cone 298. As best shown in FIG. 12, in addition to slot 269 previously mentioned, another slot 310 is provided on the opposite side of housing 238 such that housing 238 may be used on either the left or right hand side of overhead door system 200 (FIG. 8) and a slot 269 or 310 will be facing inwardly for easy visibility to the installer.

As further shown in FIGS. 11 and 12, worm 230 is mounted for rotation within a worm housing portion 312 of gear housing 238 such that worm 230 is engaged with helical gear portion 304. Worm housing 312 includes a pair of end slots 314, 316 (FIG. 12) having closed curved ends 318 (only one of which appears in the drawings) which receive respective cylindrical shafts 320, 322 of worm 230 for rotation. Respective pairs of inward projections or curved "bumps" 323, 324 and 325, 326 keep shaft portions 320, 322 within the closed curved portions of slots 314, 316 after shaft portions 314, 316 have been "snapped" in place past projections 323, 324 and 325, 326. The connection is exemplified in FIG. 11 with cylindrical shaft 320 retained for rotation within closed curved slot end 318. It will be understood that the opposite shaft 322 is retained in slot 316 in exactly the same manner and therefore the description of slot 314 applies to slot 316 as well.

Referring specifically to FIG. 11, curved end 318 has a radius of curvature substantially equal to the radius of cylindrical shaft 320. Curved end 318 forms slightly more than a semi-circular curve between projections 323, 324 such that cylindrical shaft 320 is firmly held in place for rotation in closed end 318 by projections 323, 324. To help ensure that worm 230 is retained firmly in worm housing 312, ratchet teeth 327, 328 are provided on opposing sides of slot 314 for engaging ratchet teeth 329, 330 of a retainer piece 331. Retainer piece 331 closes both slots 314, 316, although only one end of retainer piece 331 for slot 314 is shown. The end of retainer piece 331 which closes slot 316 is of the same design. Retainer piece 331 includes a curved surface 332 for engaging or at least following the outer surface of cylindrical shaft 320 of worm 230. Retainer piece 331 is simply pushed into slot 314 once worm 230 has been inserted into housing 312 as shown in dotted lines in FIG. 11. Ratchet teeth 327, 328 engage respective ratchet teeth 329, 330 to prevent retainer piece 331, and therefore worm 230, from coming loose or coming completely out of housing 312. It will be appreciated that the main retention for worm 230 within housing 312 is provided by helical ring gear portion 304 of gear cone 298 since the teeth of gear portion 304 trap worm 230 within housing 312 preventing withdrawal out slots 314, 316.

Figure 13:
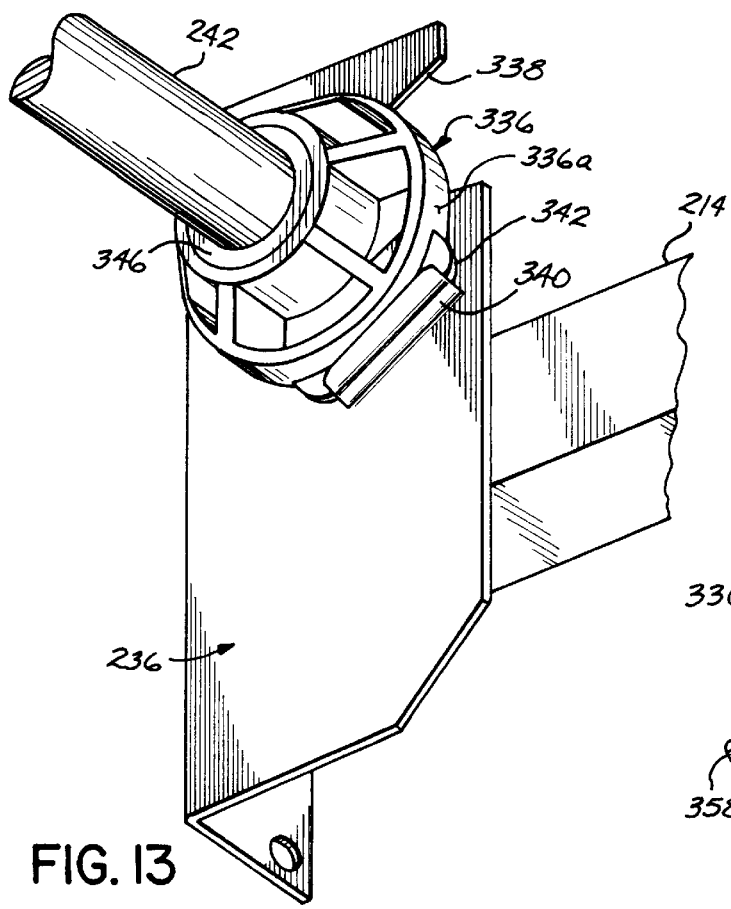
FIG. 13 is a perspective view of a bearing unit mounted in place of the counterbalancing mechanism and associated winding mechanism shown on the right hand side of FIG. 8.
Figure 14:
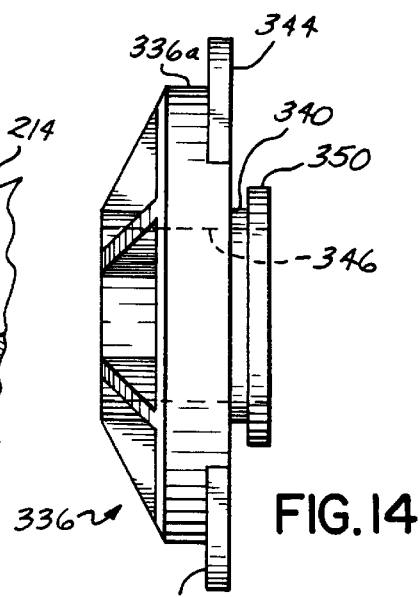
FIG. 14 is a side elevational view of the bearing unit shown in FIG. 13.

When only one counterbalancing mechanism, such as mechanism 218 in FIG. 8, is necessary for a particular overhead door, then the other counterbalancing mechanism 220 is substituted with a bearing unit 336 as shown in FIGS. 13 and 14. Bearing unit 336 simply substitutes for the entire counterbalancing mechanism 220 by attaching in exactly the same manner to mounting bracket 236. In this regard, bearing unit 336 is inserted into slot 338 of bracket 236 in exactly the same manner as described above with respect to mounting bracket 234 and housing 238. Slot 338 has the same configuration as slot 270 in mounting plate 234. Flange mounts 340 (only one being shown in FIG. 13) are provided for receiving a pair of flanges 342, 344 (FIG. 14) extending from bearing unit 336. An inner bearing portion 346 receives torsion shaft 242 and allows free rotation thereof as door 202 (FIG. 8) is opened and closed. It will further be appreciated that bearing unit 336 has an identically designed cylindrical mounting portion 348 and circular flange 350 as housings 238, 240 to facilitate complete interchangeability of bearing unit 336 with either housing 238 or 240. Outer periphery 336a of bearing unit 336 is sized to receive one of the ends of cover 252 (FIG. 8) with a friction fit. Stepped portions are not illustrated on bearing unit 336 as they are on housing 238, as bearing unit 336 may always be mounted on the same side of door 202 when only one counterbalancing mechanism 220 is necessary. Of course, stepped portions could be provided if desired.

Figure 16:
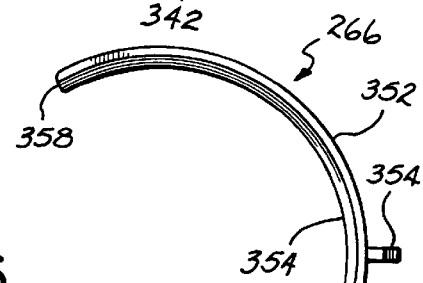
Figure 15:
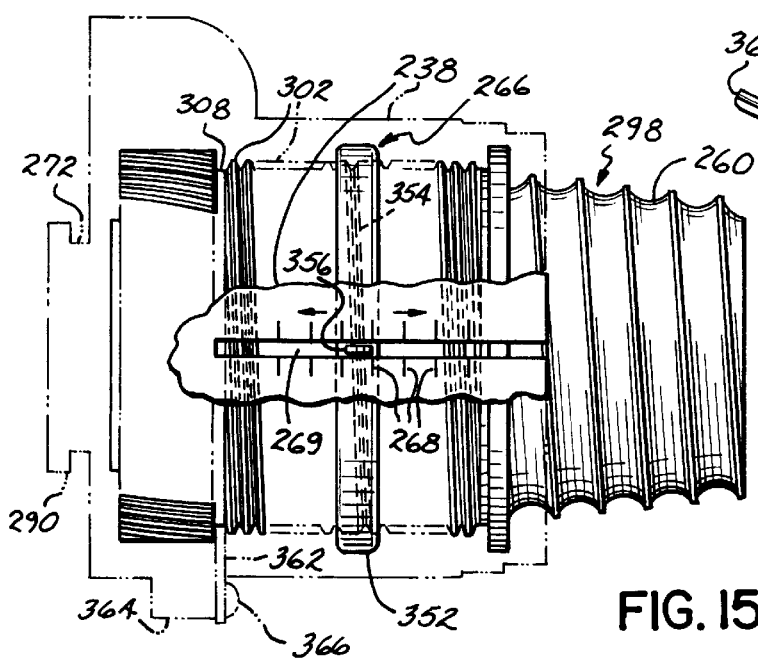
FIG. 15 is a side elevational view of the spring winding mechanism of the second embodiment fragmented to show the spring winding counting device; and, FIG. 16 is a side elevational view of the clip used in the spring winding counting device of FIG. 15.

As briefly mentioned above, each winding mechanism 226, 228 is provided with an identical mechanism for counting the number of windings imparted to the respective torsion springs 222, 224. Therefore, the description of counting device 266 of winding mechanism 226 will suffice for purposes of clarity. As shown in FIGS. 15 and 16, the counting mechanism of the second embodiment utilizes a clip 352 which clips onto threaded intermediate portion 302 of gear cone 298 and includes an inwardly extending thread 354 of the same pitch as threaded portion 302. Clip 352 further includes a central pointer 356 which extends through and is captured with slot 269. Pointer 356 indicates the number of spring windings by pointing to corresponding graduations on scale 268. As pointer 356 is captured within slot 269, it does not rotate with threaded portion 302, but instead traverses along slot 269 as gear cone 298 rotates. The pitch of threaded portion 302 and the spacing of graduations on scale 268 are chosen such that one full turn of helical gear portion 304 and therefore spring 222 (FIGS. 8 and 9) will be indicated as one winding or turn on scale 268.

It will be appreciated from FIG. 16 that clip ends 358, 360 are able to grip threaded portion 302 because clip 352 forms more than a semi-circle, however, clip 352 is still dimensioned with a small enough curvature and is also resilient enough to be easily clipped onto threaded portion 302 of gear cone 298. Like the other major components of winding mechanism 226 and bearing unit 336, clip 352 is preferably formed from the "Esbrid" nylon mentioned above.

Finally, as also shown in FIG. 15, a gear cone retaining plate 362 is fixed to gear housing 238, and specifically to a mount 364 having a threaded hole 364a (FIGS. 11 and 12) thereof, by a screw fastener 366. Retaining plate 362 extends into annular slot 308 located between threaded portion 302 and helical gear portion 304 of gear cone 298. This retaining plate 362 ensures that gear cone 298 is retained within housing 238 during shipping and handling of the assembly prior to assembly and may also be left in place after installation to help stabilize gear cone 298 within housing 238 and ensure more accurate counting of the spring windings.

Operation

Referring to FIG. 1, after the garage door 12 and counterbalancing mechanism 30 have been installed substantially as shown in FIG. 1 with the door 12 in a closed position, the installer simply engages drive head 78 of worm drive gear 70 with an appropriate tool 80 (FIG. 3) to disengage gear retainer 82 and then rotates worm drive gear 70 clockwise as viewed from the perspective of FIG. 2. This rotates gear cone 54 and winds spring 32, adding a number of coils equal to the number of turns of gear cone 54. When end portion 154a of pointer 154 reaches the required number of turns as indicated on the graduated scale 152, the installer stops turning worm drive gear 70. When tool 80 is disengaged, gear retainer and, more specifically spring clip portion 86 automatically springs back to restrain hex portion 78a of drive head 78 from rotating.

It should be noted that if adjacent coils were abutting or, in other words, touching when the winding process was started, then the spring would grow or lengthen by an amount corresponding to the number of coils added. However, with the present invention, this spring growth is accommodated through the use of the spring 32 having the preset gap 104 between adjacent coils 106 or by one of the two moving end fittings or cones 116 or 126 which replace fitting 36 when a spring having abutting coils is used. Spring growth and contraction is also accommodated during normal raising and lowering operations of door 12 by way of either the predetermined gaps 104 of spring 32 or by way of an axially moving end fitting or cone 116 or 126 as described above. Unwinding of the spring is accomplished in the same manner as winding except that the worm drive gear is rotated in a counterclockwise direction.

The operation of the second embodiment depicted in FIGS. 8–16 is the same as the first embodiment once, one or both counterbalancing mechanisms 218, 220 are installed as shown in FIG. 8, except that the gear retainer shown in the first embodiment has been eliminated from the second embodiment. It will be appreciated that a gear retainer according to the first embodiment may also be provided for the second embodiment.

As will be appreciated from the foregoing, the second embodiment of FIGS. 8–16 has many of the same advantages as the first embodiment and, in addition, one of ordinary skill will recognize that many of the different advantageous features of each embodiment may be combined into a single overhead door system. One of the main advantages of the second embodiment is readily apparent from a comparison of FIGS. 11 and 15, wherein the same winding mechanism 226 may used in either a left or right hand orientation while still exposing a slot 269 or 310 for indicating the number of spring windings and also exposing a drive portion 262 or 263 (see FIG. 12) downwardly toward the installer.

Although preferred embodiments of the invention have been detailed above, those of ordinary skill in the art will readily recognize modifications thereof and substitutions of various components which do not depart from the spirit of the invention. For example, although the embodiment of FIGS. 6 and 7 is shown with two rollers, it may alternatively be designed to have more or less than this number of rolling elements and may simply be comprised of a roller bushing which allows axial motion along the torsion shaft but not rotation about the torsion shaft. Also, it will be appreciated that an appropriate counting mechanism may be provided to count the number of revolutions of the gear cone and thereby count the number of coils added to the torsion spring during the initial winding process. It will further be appreciated that the relative positions of the adjacent drum and bearing may be reversed, at least on the end of the torsion shaft having the counterbalancing mechanism, such that the hub of the drum abuts the bushing of the gear cone to directly take the thrust load of the spring instead of indirectly taking this load by abutting the bearing. Thus, the drum may either directly or indirectly bear the thrust load and, in either event, this load will not be on the sheet metal support or housing.

With these and other additions and modifications taken into consideration, it is the Applicant's intent to be bound only by the scope of the appended claims.

What is claimed is:

1. An overhead door system, including an overhead door which is operative to open and close a door opening having left and right sides as viewed from inside said overhead door, and counterbalancing apparatus for said overhead door, said apparatus comprising:
   a) a torsion shaft mounted for rotation between left and right stationary supports respectively mounted adjacent said left and right sides of said overhead door;
   b) a torsion spring having a first end and a second end, said first end fixed to said torsion shaft so as to allow rotation with said torsion shaft;
   c) a winding mechanism connected to one of said left and right stationary supports by respective connecting elements on said one of said left and right stationary supports and said winding mechanism, said winding mechanism further having a ring gear connected to said second end of said torsion spring and a worm engaged with said ring gear, wherein rotation of said worm rotates said ring gear to wind said second end of said torsion spring with respect to said first end, and said counterbalancing apparatus being adapted for connection to said left or right stationary support and being connected to one of said left and right station supports while a drive portion thereof is oriented at a downward angle away from said door at either location.

2. The overhead door of claim 1 wherein said left and right stationary supports each comprise a bracket having a slot, said slot including an open end and a closed end and a pair of opposed inward projections positioned between said open and closed ends, said winding mechanism further including a housing containing said ring gear and having mounting structure received within said slot and retained in place by said projections.

3. The overhead door system of claim 2 wherein said bracket further includes a flange mount disposed on a first side of said bracket adjacent each side of said slot and said housing includes a pair of flanges which are retained by said flange mounts when said mounting structure is retained by said projections.

4. The overhead door system of claim 3 wherein said flanges extend away from said housing in directions substantially parallel to said worm and substantially perpendicular to said slot.

5. The overhead door system of claim 1 further comprising a bearing unit attached to the other of said left and right stationary supports to which said counterbalancing apparatus is not connected, wherein said bearing unit also includes connecting elements which mate with said connecting elements on both said left and right stationary supports and is thereby adapted for connection to said left or right stationary support.

6. An overhead door system, including an overhead door which is operative to open and close a door opening having left and right sides as viewed from inside said overhead door, and counterbalancing apparatus for said overhead door, said apparatus comprising:
   a) a torsion shaft mounted for rotation between left and right stationary supports respectively mounted adjacent said left and right sides of said overhead door;
   b) a torsion spring having a first end and a second end, said first end fixed to said torsion shaft so as to allow rotation with said torsion shaft; and
   c) a winding mechanism connected to one of said left and right stationary supports by respective connecting elements on said one of said left and right stationary supports and said winding mechanism, said winding mechanism further having a ring gear connected to said second end of said torsion spring and a worm engaged with said ring gear, wherein rotation of said worm rotates said ring gear to wind said second end of said torsion spring with respect to said first end, and said counterbalancing apparatus being adapted for connection to said left or right stationary support and being connected to one of said left and right station supports while a drive portion thereof is oriented at a downward angle away from said door at either location;
   wherein said worm includes drive portions on opposing ends thereof with each drive portion being exposed for engagement by a tool, wherein only one of said drive portions is directed at a downward angle away from said door depending on which of said left and right stationary supports is connected to said counterbalancing apparatus.

7. A method of installing a counterbalancing apparatus on an overhead door system having an overhead door which is operative to open and close a door opening having left and right sides as viewed from inside said overhead door and bounded by a floor on a bottom side of said door opening, said method comprising:
   mounting left and right stationary supports adjacent said left and right sides, respectively, of said overhead door;
   mounting a torsion shaft for rotation between said left and right stationary supports;
   mounting a torsion spring on said torsion shaft, said torsion spring having first and second ends and said first end being fixed to said torsion shaft so as to allow rotation with said torsion shaft;
   selectively connecting a winding mechanism to one of said left and right stationary supports;
   connecting a ring gear of said winding mechanism to said second end of said torsion spring;
   engaging a worm gear with said ring gear, wherein rotation of said worm gear rotates said ring gear to wind said second end of said torsion spring with respect to said first end thereof; and
   orienting a drive portion of said worm gear downwardly with respect to a horizontal plane and away from said door irrespective which of said stationary supports is connected to said winding mechanism to provide access from inside said door opening to said drive portion by a user on said floor.

8. The method of claim 7 wherein said drive portion is oriented at approximately a 45° with respect to the horizontal plane.

9. The method of claim 7 further comprising:
   mounting a second torsion spring on said torsion shaft, said second torsion spring having first and second ends and said first end being fixed to said torsion shaft so as to allow rotation with said torsion shaft;
   connecting a second winding mechanism to whichever of said left and right stationary supports is not connected to said winding mechanism, said winding mechanism and said second winding mechanism being substantially identical;
   connecting a ring gear of said second winding mechanism to said second end of said second torsion spring, a worm gear of said second winding mechanism being engaged with said ring gear, wherein rotation of said worm gear rotates said ring gear to wind said second end of said second torsion spring with respect to said first end thereof; and
   orienting a second drive portion of said worm gear downwardly with respect to said horizontal plane and away from said door to provide access from inside said door opening to said drive portion by a user on said floor, said second drive portion being coaxial on said worm gear with said drive portion and being directed upwardly with respect to said horizontal plane.

10. An overhead door system, including an overhead door which is operative to open and close a door opening having left and right sides as viewed from inside said overhead door, and counterbalancing apparatus for said overhead door, said apparatus comprising:
    a) a torsion shaft mounted for rotation between left and right stationary supports respectively mounted adjacent said left and right sides of said overhead door;
    b) a torsion spring having a first end and a second end, said first end fixed to said torsion shaft so as to allow rotation with said torsion shaft; and
    c) a winding mechanism connected to said torsion spring, said winding mechanism having a ring gear connected to said second end of said torsion spring and a worm engaged with said ring gear, wherein rotation of said worm rotates said ring gear to wind said second end of said torsion spring with respect to said first end, and a drive portion of said counterbalancing apparatus being oriented at a downward angle away from said door.

11. A method of installing a counterbalancing apparatus on an overhead door system having an overhead door which is operative to open and close a door opening having left and right sides as viewed from inside said overhead door and bounded by a floor on a bottom side of said door opening, said method comprising:
    mounting left and right stationary supports adjacent said left and right sides, respectively, of said overhead door;
    mounting a torsion shaft for rotation between said left and right stationary supports;
    mounting a torsion spring on said torsion shaft, said torsion spring having first and second ends and said first end being fixed to said torsion shaft so as to allow rotation with said torsion shaft;

selectively connecting a winding mechanism to said torsion spring;

connecting a ring gear of said winding mechanism to said second end of said torsion spring;

engaging a worm gear with said ring gear, wherein rotation of said worm gear rotates said ring gear to wind said second end of said torsion spring with respect to said first end thereof; and orienting a drive portion of said worm gear downwardly with respect to a horizontal plane and away from said door to provide access from inside said door opening to said drive portion by a user on said floor.

* * * * *